(12) United States Patent
Kochert et al.

(10) Patent No.: US 7,926,867 B2
(45) Date of Patent: Apr. 19, 2011

(54) REINFORCING COMPONENT

(75) Inventors: Stefan Kochert, Reilingen (DE); Jochen Becker, Angelbachtal (DE); Ralph Dalhaeuser, Viernheim (DE); Andres Stiller, Heidelberg (DE); Alexander Straub, Ettlingen (DE); Thomas Hogger, Munich (DE); Mark Riess, Fahrenzhausen (DE); Josef Reindl, Karlsfeld (DE); Juergen Kempf, Munich (DE); Niklas Eberle, Munich (DE); Robert Schalausky, Poecking (DE)

(73) Assignees: Henkel AG & Co., KGaA (DE); Bayerische Motoren Werke Aktiengesellschaft (DE)

( * ) Notice: Subject to any disclaimer, the term of this patent is extended or adjusted under 35 U.S.C. 154(b) by 362 days.

(21) Appl. No.: 11/950,527

(22) Filed: Dec. 5, 2007

(65) Prior Publication Data
US 2008/0217960 A1    Sep. 11, 2008

Related U.S. Application Data

(60) Provisional application No. 60/868,620, filed on Dec. 5, 2006.

(51) Int. Cl.
*B62D 25/04* (2006.01)
(52) U.S. Cl. ......... 296/187.02; 296/193.06; 296/203.02; 296/205
(58) Field of Classification Search ............. 296/187.02, 296/203.03, 193.08, 205, 203.01, 209, 29, 296/193.05, 193.06; 52/831, 843, 846, 847
See application file for complete search history.

(56) References Cited

U.S. PATENT DOCUMENTS

| | | | |
|---|---|---|---|
| 4,861,097 A | 8/1989 | Wycech | |
| 4,901,500 A | 2/1990 | Wycech | |
| 4,978,562 A | 12/1990 | Wycech | |
| 6,168,226 B1 * | 1/2001 | Wycech | 296/146.6 |
| 6,233,826 B1 | 5/2001 | Wycech | |
| 6,358,584 B1 | 3/2002 | Czaplicki et al. | |
| 6,378,933 B1 * | 4/2002 | Schoen et al. | 296/187.02 |
| 6,419,305 B1 * | 7/2002 | Larsen | 296/203.03 |
| 6,467,834 B1 * | 10/2002 | Barz et al. | 296/187.02 |
| 6,471,285 B1 | 10/2002 | Czaplicki et al. | |
| 6,474,723 B2 | 11/2002 | Czaplicki et al. | |
| 6,573,309 B1 | 6/2003 | Reitenbach et al. | |
| 6,575,526 B2 * | 6/2003 | Czaplicki et al. | 296/187.02 |
| 6,619,727 B1 * | 9/2003 | Barz et al. | 296/187.02 |
| 6,641,208 B2 * | 11/2003 | Czaplicki et al. | 296/187.02 |
| 6,786,533 B2 * | 9/2004 | Bock et al. | 296/187.02 |
| 6,793,274 B2 | 9/2004 | Riley et al. | |
| 6,938,947 B2 * | 9/2005 | Barz et al. | 296/187.02 |
| 6,941,719 B2 * | 9/2005 | Busseuil et al. | 52/846 |

(Continued)

FOREIGN PATENT DOCUMENTS

CA    2471368    7/2003

(Continued)

*Primary Examiner* — Glenn Dayoan
*Assistant Examiner* — Gregory Blankenship
(74) *Attorney, Agent, or Firm* — Mary K. Cameron (57) ABSTRACT

A lengthwise extended component contains of a support that possesses flow channels in the direction of its longitudinal axis. The support additionally possesses external surfaces that are offset to each other in the direction of the longitudinal axis as well as a lateral external surface. These external surfaces are provided with a layer of a thermally expansible and curable composition. Reinforcing components of this type are suitable for stiffening and/or reinforcing hollow supports, such as the A-, B- or C-pillars, the roof edges or the rocker panels of vehicles, especially passenger cars.

54 Claims, 8 Drawing Sheets

U.S. PATENT DOCUMENTS

| | | | |
|---|---|---|---|
| 6,953,219 B2 * | 10/2005 | Lutz et al. | 296/187.02 |
| 7,141,194 B1 | 11/2006 | Beckmann | |
| 7,255,388 B2 * | 8/2007 | Le Gall et al. | 296/187.02 |
| 7,296,847 B2 * | 11/2007 | Czaplicki et al. | 296/187.02 |
| 7,354,221 B2 * | 4/2008 | Congdon | 404/84.1 |
| 7,422,088 B2 * | 9/2008 | Ito | 181/198 |
| 7,503,620 B2 * | 3/2009 | Brennecke et al. | 296/187.02 |
| 2001/0020794 A1 * | 9/2001 | Ishikawa | 296/188 |
| 2001/0042353 A1 * | 11/2001 | Honda et al. | 52/731.6 |
| 2002/0074827 A1 | 6/2002 | Fitzgerald et al. | |
| 2004/0124553 A1 | 7/2004 | Czaplicki et al. | |
| 2004/0143969 A1 | 7/2004 | Czaplicki et al. | |
| 2004/0164588 A1 | 8/2004 | Lutz et al. | |
| 2004/0256888 A1 * | 12/2004 | Le Gall et al. | 296/187.02 |
| 2004/0266889 A1 | 12/2004 | Hirahra | |
| 2005/0017543 A1 | 1/2005 | Riley et al. | |
| 2005/0040671 A1 | 2/2005 | Barz | |
| 2005/0082872 A1 | 4/2005 | Rich et al. | |
| 2005/0218697 A1 | 10/2005 | Barz et al. | |
| 2005/0276970 A1 | 12/2005 | Busseuil et al. | |
| 2006/0008615 A1 | 1/2006 | Muteau et al. | |
| 2006/0188726 A1 | 8/2006 | Muenz et al. | |
| 2007/0090666 A1 | 4/2007 | Brennecke et al. | |
| 2007/0122510 A1 | 5/2007 | Mendiboure et al. | |
| 2009/0001758 A1 * | 1/2009 | Hanley et al. | 296/187.02 |
| 2009/0018483 A1 * | 1/2009 | Walker et al. | 604/6.08 |
| 2009/0085379 A1 * | 4/2009 | Takahashi et al. | 296/193.06 |

FOREIGN PATENT DOCUMENTS

| | | |
|---|---|---|
| EP | 1 064 188 A1 | 1/2002 |
| WO | WO 00/52086 | 2/2000 |
| WO | WO 01/54935 | 8/2001 |
| WO | WO 01/54936 A1 | 8/2001 |
| WO | 03000535 A1 | 1/2003 |
| WO | WO 03/054069 | 7/2003 |
| WO | WO 2004/065485 | 8/2004 |

* cited by examiner

REINFORCING COMPONENT

CROSS-REFERENCE TO RELATED APPLICATION

This application claims the priority of U.S. Provisional application 60/868,620, filed 5 Dec. 2006, the disclosure of which is expressly incorporated by reference herein.

FIELD OF THE INVENTION

The invention relates to a reinforcing component based on a support material and a thermally expansible and curable adhesive layer, as well as an auto body component comprising such a reinforcing component.

DISCUSSION OF THE RELATED ART

For many years now the automobile industry has endeavored to provide improved vehicle structures that are capable of absorbing or deflecting shocks or sudden stresses on the passenger cell. For this, structures are employed, for example, that reinforce or stiffen the frame surrounding the passenger cell by means of metallic components. However, these metallic components increase the vehicle weight undesirably. Other approaches for solving this problem provide reinforcing parts from components of complex shape that are joined to the vehicle frame by welding or mechanical fasteners.

In U.S. Pat. No. 4,978,562 is described a specific lightweight, composite, reinforcing beam for a door consisting of a metal tube, partially filled with a specific lightweight cellular polymer. It was proposed to mix curable resins based on epoxy resins, vinyl ester resins, unsaturated polyester resins and polyurethane resins with the corresponding curing agents, fillers and cell forming agents in an extruder, to cure this mixture to form a core and then insert it into the metal tube such that the core is frictionally or mechanically held in the tube. Alternatively, the polymer core can be produced from liquid or pasty polymeric material by casting and introduced into the tube.

Analogously, U.S. Pat. Nos. 4,861,097 and 4,901,500 describe specific lightweight composite beams made from foamed polymers and metallic structures for reinforcing vehicle doors. According to this teaching, firstly the polymeric core part is formed by manufacturing a liquid or pasty reinforcing material, which is then injected or cast into a canal-like structure and then cured. After this the cured core part is introduced into the metallic structural cavity. Alternatively, the core can be preformed by injection molding or casting and then inserted into the cavity.

EP 1 064 188 A1 discloses a process for manufacturing a hollow profile with inner reinforcement, especially for use in automobile bodies, in which a solid core material is coated with activatable material and an outer panel is arranged so as to form a defined hollow space. In this way the hollow space is completely filled by foaming the activatable material. The solid core material is formed from a foamed or non-foamed metallic material or from a synthetic material reinforced with metal fibers, carbon fibers or glass fibers or from a hollow profile, and the profile, prior to the foaming process of the activatable material, is passed to a corrosion treatment bath, wherein the corrosion protection agent reaches all areas of the internal profile. The hollow profile is then passed to a drying oven, in which a reaction of the activatable material is initiated, whereby the defined cavity between the activatable material and the outer panel is filled up.

WO 01/054935 describes a reinforcing member made from a tubular support receiving thereon a thermally expansible reinforcing material and a fastener that fixes the reinforcing material to the support. The reinforcing material may be provided as a plurality of longitudinally spaced annular elements arranged on the support. Upon heating, the reinforcing material expands and bonds the support to the structural member of the vehicle so as to provide additional strength and stiffness.

WO 01/054936 A1 describes a reinforcing member in the form of self-supporting body that expands when heated to an expansion temperature. The body comprises a first and second group of ribs that are spaced apart from one another. During heat activation, heated air can travel between the ribs that are spaced apart, thus allowing a greater surface area of the reinforcing material to be exposed to heat, leading to an improved expansion. When the body is heated to the expansion temperature, each of these ribs expands and contacts the other ribs.

U.S. Pat. No. 6,641,208 B2 describes a reinforced sleeve comprising an elongated support and a reinforcing medium that is supported by the support, wherein the reinforcing medium extends along at least a portion of the length of the support. The support is hollow and possesses axially extending ribs on one internal wall. The reinforcing medium is preferably an epoxy-based resin. The reinforcing medium is preferably a heat-activatable structural foam.

BRIEF SUMMARY OF THE INVENTION

The present invention provides components for stiffening and reinforcing hollow supports, which have a low weight, lend the supports high torsional and bending stiffness and can be easily industrially manufactured.

In the invention, a lengthwise extended support is provided that can be positioned parallel to the longitudinal axis of a hollow support such as an automobile pillar and whose external surfaces facing the inner sides of the cavity walls of the hollow support are provided with a layer of a thermally expansible and curable composition, wherein the support possesses flow channels in the direction of its longitudinal axis.

The invention further provides a stiffened and/or reinforced lengthwise extended hollow support that possesses a wall or a plurality of walls that encloses the cavity. In the cavity is located a lengthwise extended component that is made of a support positioned parallel to the longitudinal axis of the hollow support and whose external surfaces are provided with a layer of a thermally expansible and curable composition, wherein the support possesses flow channels in the direction of its longitudinal axis.

DETAILED DESCRIPTION OF CERTAIN EMBODIMENTS OF THE INVENTION

In the context of this invention, hollow supports are, for example, the A-, B- or C-pillars of an automobile body, which support the roof structure; in addition, hollow supports in the context of this invention are roof columns or cross ties as well as wheel arches or also engine mounts.

The flow channels preferably have flow openings that are arranged perpendicular to the longitudinal axis and whose lateral boundaries are arranged diagonally to the longitudinal axis of the support.

The external surfaces of the support carrying the thermally expansible and curable composition are linked together over flow channels, such that during production in the injection molding process, a continuous flow of the curable composition is possible on all exterior surfaces defined for this.

The reinforcing component is dimensioned such that the component coated with the curable composition in the unexpanded and uncured state allows for a flow opening on all sides of up to 4 mm thick, preferably up to 2 mm thick, between the component and the inner sides of the cavity walls of the automobile pillar.

In principle, the support of the reinforcing component can be manufactured from a large number of materials; preferably it is manufactured from thermoplastic polymers in an injection molding process. Preferred thermoplastic materials should possess low water absorption and provide dimensional stability up to 180° C. The thermoplastic materials can be selected from polyamides, preferably polyamide-6, polyphenylene sulfides (PPS), polyphenylene ethers (PPE), polyphenylene sulfones (PPSU) and polyphenylene imides (PPI). Fiber-reinforced polyamides are preferably employed. Short or long fibers may be employed as fibers, which are selected from the group glass fibers, polyamide fibers, polyimide fibers, carbon fibers, steel fibers or aluminum fibers. Particular preference is given here to glass fibers or polyamide fibers. Moreover, the thermoplastic can comprise mineral fillers, for example ground or precipitated chalks, carbon black, calcium carbonate, magnesium carbonate, barium sulfate or their mixtures may be mentioned.

Preferably, the support for the reinforcing component generally possesses constant wall thicknesses. Although the thermally expansible and curable composition may be selected from a plurality of compositions, those that are preferred are based on epoxy resins, curing agents and blowing agents, as for example are disclosed in U.S. Pat. No. 6,573,309; US 2004-266899; and US 2006-188726, each of which is incorporated herein by reference in its entirety. For expansion and curing, these thermally expansible and curable compositions are heated to temperatures between 130° C. and 220° C., preferably between 130° C. and 180° C., whereby they expand and cure to a solid structural foam. This expansion and curing usually occurs in the paint-drying oven that follows the cathodic electrodeposition coating (EDC) of the automobile body.

The thermally expansible and curable composition forms a layer on the external surfaces of the component support and in the unexpanded state has a layer thickness of 2 to 15 mm, preferably 3 to 10 mm. The composition in one embodiment provides a degree of expansion of 50 to 100%.

The invention also includes a stiffened and/or reinforced hollow automobile pillar that comprises in its cavity a lengthwise extended component according to the previous description. When brought into the EDC oven, the expansible and curable composition of this component is expanded and cured at temperatures between 130 and 220° C., especially between 150 and 180° C. In this way the desired interlocked bracing system is produced between the cavity walls of the automobile pillar and the reinforced lengthwise extended component.

A preferred embodiment of the inventive components is described below in more detail by means of FIGS. 1 to 10.

Figure 1:
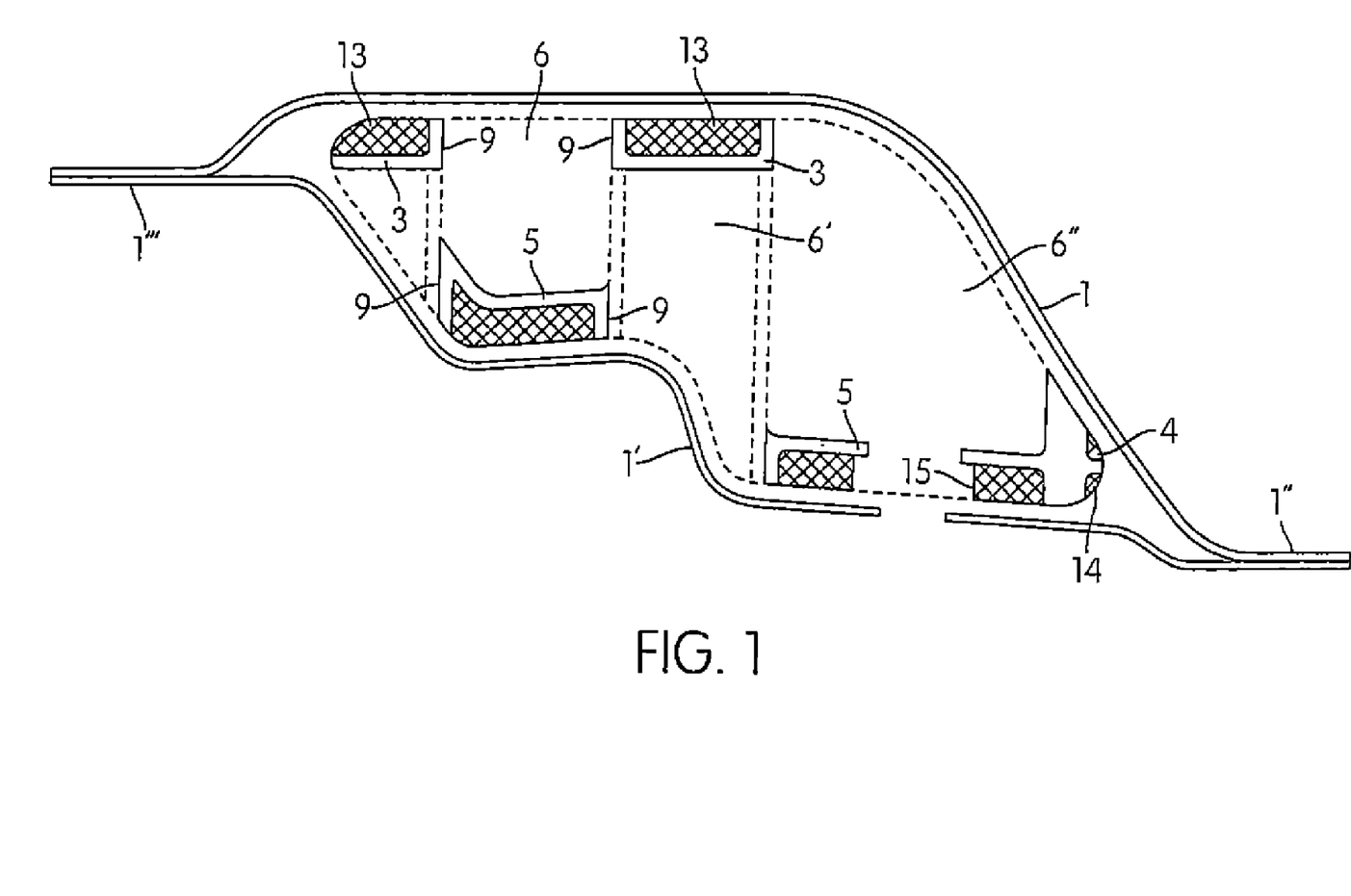
FIG. 1 illustrates a cross section through the basic design of a hollow support with the stiffening part located therein which is made of the support and the adhesive layers of a thermally expansible and curable composition.

The basic design of an inventively stiffened and/or reinforced automobile pillar is illustrated in FIG. 1. The automobile pillar (hollow support) is produced from both of the half shells (1) and (1'), which are joined together at both joining seams (1") and (1'"). This can result by means of conventional joining methods such as welding, spot welding, flanging and/or gluing. In the cavity formed by both the half shells (1) and (1'), the cross section of the reinforcing part is visible, consisting of the support, onto the external surfaces (3), (4) and (5) of which, is deposited a layer of a thermally expansible and curable adhesive composition (13, 14, 15). The external surfaces (3), (4) and (5) of the support which face the inner sides of the cavity walls (1') are laterally limited by boundary walls (9) that are arranged perpendicular to the external walls in regard to both of the walls (1, 1') enclosing the cavity. The curable adhesive composition in the unexpanded state has a layer thickness of 2 to 15 mm, preferably 3 to 10 mm and has a degree of expansion of 50 to 100% when expanded and cured at expansion temperatures between 130° C. and 220° C., preferably between 150° C. and 180° C. The support component is dimensioned such that between the upper side of the unexpanded layers (13, 14, 15) and the inner side of the walls (1, 1') enclosing the cavity, a flow opening of up to 4 mm thick, preferably up to 2 mm thick, is formed. The flow opening may be of variable thickness at different points around the support component.

Ideally, the reinforcing part, consisting of the support and the adhesive layers with a half shell (1 or 1'), is pre-assembled prior to joining. In the normal case, this pre-assembly is achieved by means of mechanical fasteners, so-called clips that are arranged in the relevant holes or projections (not shown in FIG. 1) of one of the half shells. Such mechanical fasteners or clips may be selected and designed such that they hold the reinforcing part in place within the cavity in the desired position and also maintain a flow opening of the desired dimensions essentially all the way around the reinforcing part.

The flow opening ensures that the various process liquids, with which the unfinished bodywork is treated, can wet all parts of the inner sides of the cavity walls. The process liquids that are mentioned here are detergent and cleaning baths, surface treatment and passivation baths such as, e.g., phosphating solutions, rinsing liquids, as well as the cathodic electrodeposition coating (EDC).

Moreover, the support possesses flow channels (6, 6', 6") that run in the direction of the longitudinal axis of the support. The function of the flow channels will be discussed further below.

Figure 2:
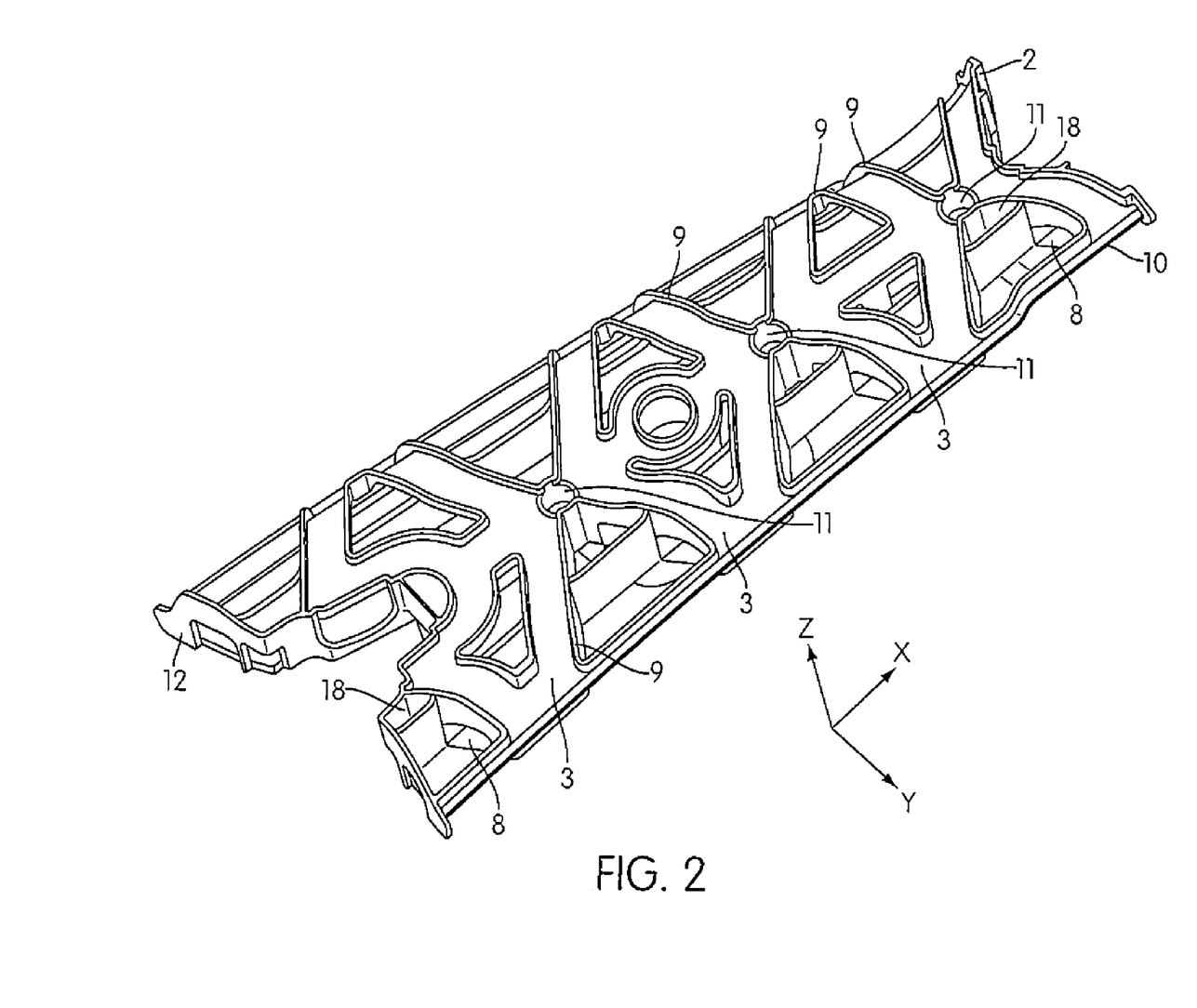
FIG. 2 shows a semi-perspective view on the "upper side" of the support.

FIG. 2 shows a semi-perspective view of the "upper side" of a preferred embodiment of a support (2). The "upper side"

of the support is designated in the following as the side of the support that does not have any projecting fasteners (clips). In FIG. 2 the external surfaces (3) of the upper side of the support are illustrated without the deposited expansible adhesive composition. In addition, the lateral boundaries (9) are visible.

The lateral boundaries ("flanges") (9) have a multiple function: firstly, during the deposition of the layers onto the support in the injection molding process, the "flanges" serve as the lateral boundary of the flow direction of the thermally expansible and curable composition. During the thermal expansion process on hardening, the flanges define the direction of expansion, whereby they simultaneously increase the foam pressure of the composition and the stiffness of the support body.

The external surfaces (3) of the upper side are joined with the corresponding external sides (5) of the lower side (not shown in FIG. 2) through the flow channels (11); they preferably run in the direction of the Z-axis of the support body perpendicular to both the external surfaces (3) and (5). The lateral boundaries (9) simultaneously form the boundary walls of the flow openings (8, 18) of the upper side of the support and the flow openings (7, 17) of the lower side of the support (see FIG. 3). The lateral boundaries are diagonal, i.e. arranged at an angle of 45° to the longitudinal axis (the X-axis) of the support. The Y-axis of the support thus forms the transverse axis perpendicular to the X-axis of the support, whereas the Z-axis runs perpendicular on the plane spanned by the X-axis and Y-axis in the direction of the upper or lower side of the support. The external side of the upper side of the support (3) merges with continuous transitions into the lateral external surface (4) of the support, wherein this lateral external surface possesses an additional reinforcing rib (10) in the direction of the X-axis of the support. This reinforcing rib has again the multi-function of limiting the flow of the adhesive composition during the injection molding process. In addition it serves to define the direction of expansion during the thermal expansion process, whereby it likewise simultaneously increases the foam pressure of the composition and the stiffness of the support body. The front boundary wall (12) serves to limit the front of the support. As can be seen in FIG. 2, it can exhibit a continuous curved course with a central recess. This boundary wall merges continuously upwards and downwards (in the Z axis) into the lateral boundary, the flanges (9).

Figure 3:
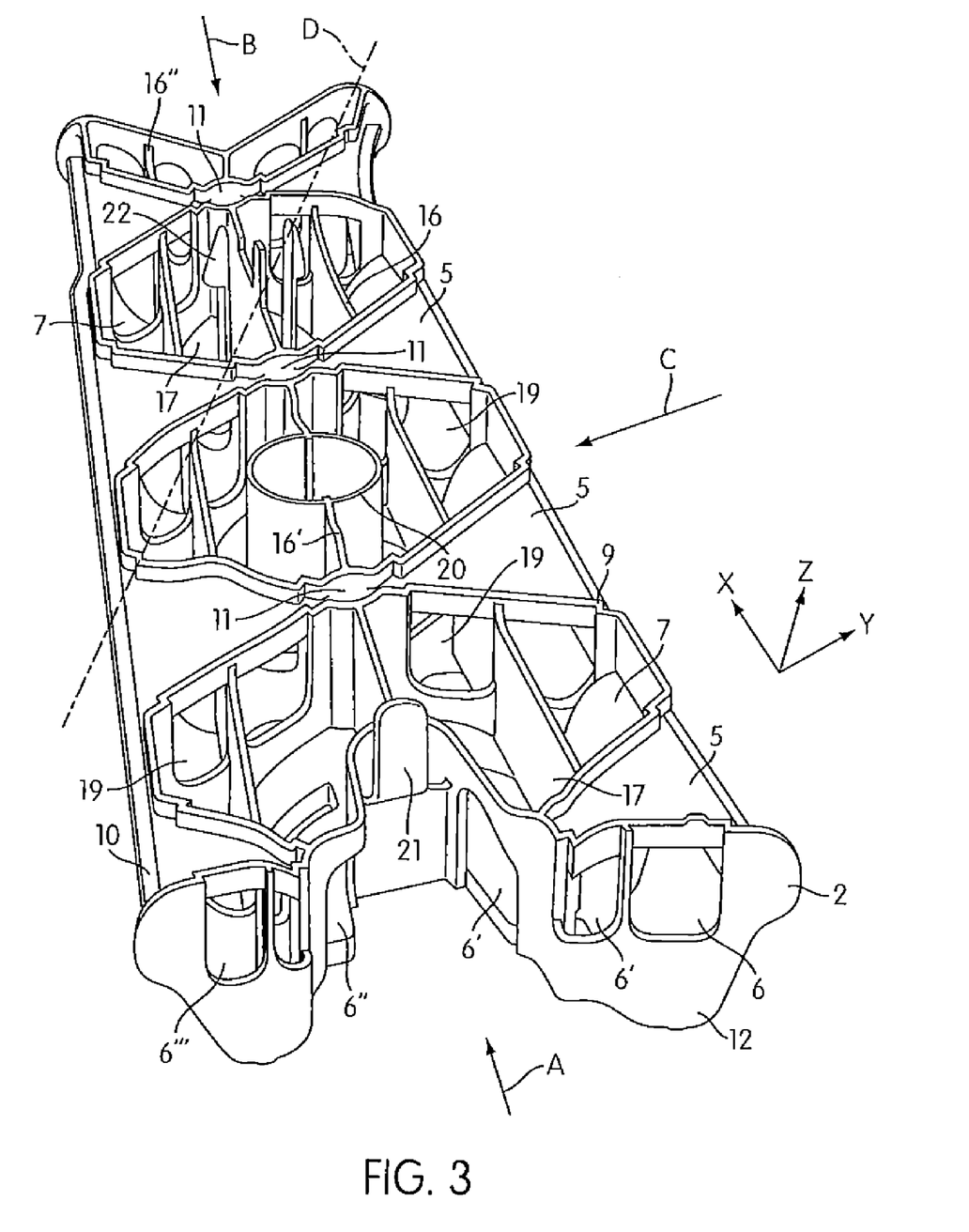
FIG. 3 shows a semi-perspective view on the "lower side" of the support.

In FIG. 3 is illustrated a semi-perspective view on the "lower side" of the support (2). Also visible here is a semi-perspective view on the front boundary wall (12) of the support with the breakouts for the flow channels (6, 6', 6", 6''') that run in the direction of the X-axis. A fastening clip (21) that is integrally molded on the front boundary wall is illustrated here. On the left side of the Figure there is also a view of the lower side of the reinforcing rib (10). Because of the semi-perspective illustration, the equivalent reinforcing rib (10) on the right side of the support is not visible. The lower external surfaces (5) of the support are again laterally bounded by the flanges (9) that, as can be clearly seen, run diagonally to the X-axis of the support. In addition, the "inner openings" (19) of the flow channels (6, 6', 6", 6''') are visible. These lateral boundaries or flanges (9) merge in the continuous molding in the area of the flow channels into the corresponding flanges (9) of the upper side and run in the direction of the Z axis of the support. The separation walls (16, 16', 16") parallel to the X-axis of the support are integrally molded with the lower and upper external surfaces of the support (5 and 3) and are perpendicular thereto. Firstly, they help to further stiffen the support by cross bracing with the flanges (9) and the external surfaces (3, 5) on the upper side and lower side of the support. Secondly, they ensure a secure and continuous flow of the process liquids during the various dipping baths in the manufacturing sequence of the automobile production. In addition, this ensures that during the bake process the hot air can arrive both in the EDC oven and to the inner sides of the hollow support in order to ensure a complete cure of the EDC coating on the hollow support. Secondly, it is also ensured that this hot air guarantees a complete and uniform expansion and cure of the expansible adhesive composition. Both the process liquids as well as the hot air from the EDC oven can also reach areas through the flow openings (7, 17, 8, 18) on the lower side and upper side, which were shielded during a continuous coating of the support with adhesive compositions. An intersection line D-D is also shown in FIG. 3. This intersection line indicates the cross sectional view of the schematic FIG. 1. The lower external surfaces (5) and upper external surfaces (3) with their corresponding adhesive coatings (15 and 13) are offset to one another in the direction of the X-axis, such that the connection of the stiffening part through the adhesive to the inner side of the hollow support is offset in each case in the direction of the X axis (see also FIG. 1).

Further, additional fastening clips (22) that are parallel to the Z-axis are visible in the upper area of FIG. 3 and serve to fasten the reinforcing member in the body shell to a hollow support shell. A "dome" (20) is illustrated in the center of the Figure. This serves to seal off adjacent areas, such as, e.g. connecting elements of the metallic component, against ingress of adhesive during the expansion.

Figure 4:
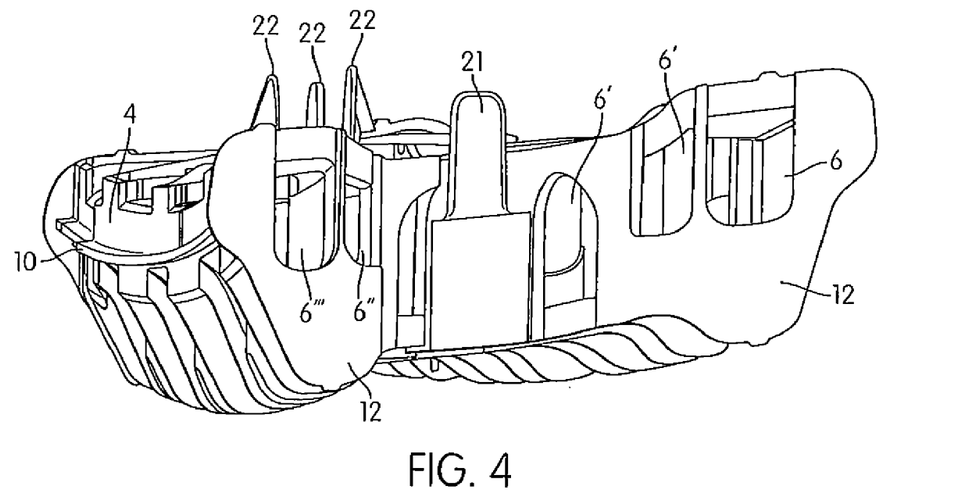
FIG. 4 shows a semi-perspective view on the wider cross sectional side of the support from the view point "A" in FIG. 3.

FIG. 4 shows a semi-perspective view of the front boundary wall (12) of the support. This line of sight is marked with "A" in FIG. 3. In FIG. 4, firstly the view of the curved course of the front boundary wall (12) of the support is once again visible, i.e., the perpendicular projection of the front boundary wall (12) in the direction of the Z-axis to the plane spanning through the X and Y axes does not form a straight line but rather a curved course. Secondly, the openings for the flow channels (6, 6', 6", 6''') in the front boundary wall are once again visible. In addition, the clip (21) that is integrally molded on the front boundary wall (12) as well as the projecting clips (22) in the background are visible in FIG. 4. It can be clearly seen that the lateral external surface (4) of the support has a continuous junction to the lower external surface (5) of the support. Furthermore, the reinforcing rib (10) running in the direction of the X-axis is visible.

Figure 5:
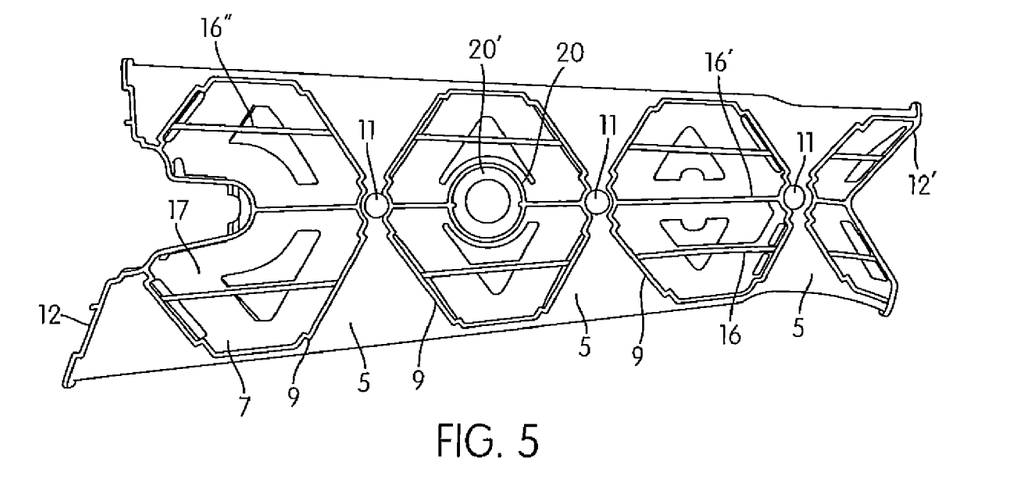
FIG. 5 shows a view on the "lower side" of the support.

In FIG. 5 is illustrated a view of the lower side of the support in the direction of the Z-axis. Once again the lower external surfaces (5) are visible with the flanges (9) as well as the non-linear course of the front (12) and back (12') boundary walls of the support, which transition integrally into the flanges (9) in the area of the external surfaces (5). Furthermore, the lower flow openings (7, 17) of the flow channels that run in the direction of the X-axis are formed by the separation walls (16, 16', 16") and are visible. The flow channels (11) that serve as the connecting channels between the external surfaces of the lower side (5) and upper side (3) are also visible and are aligned with the central separation wall (16'). The lower side of the upper external surface (3) can be seen through the flow channels (7, 17). In addition, in the central area of the support, the sealing dome (20) that has a concentric flange (20') in the region of the upper side is visible.

Figure 6:
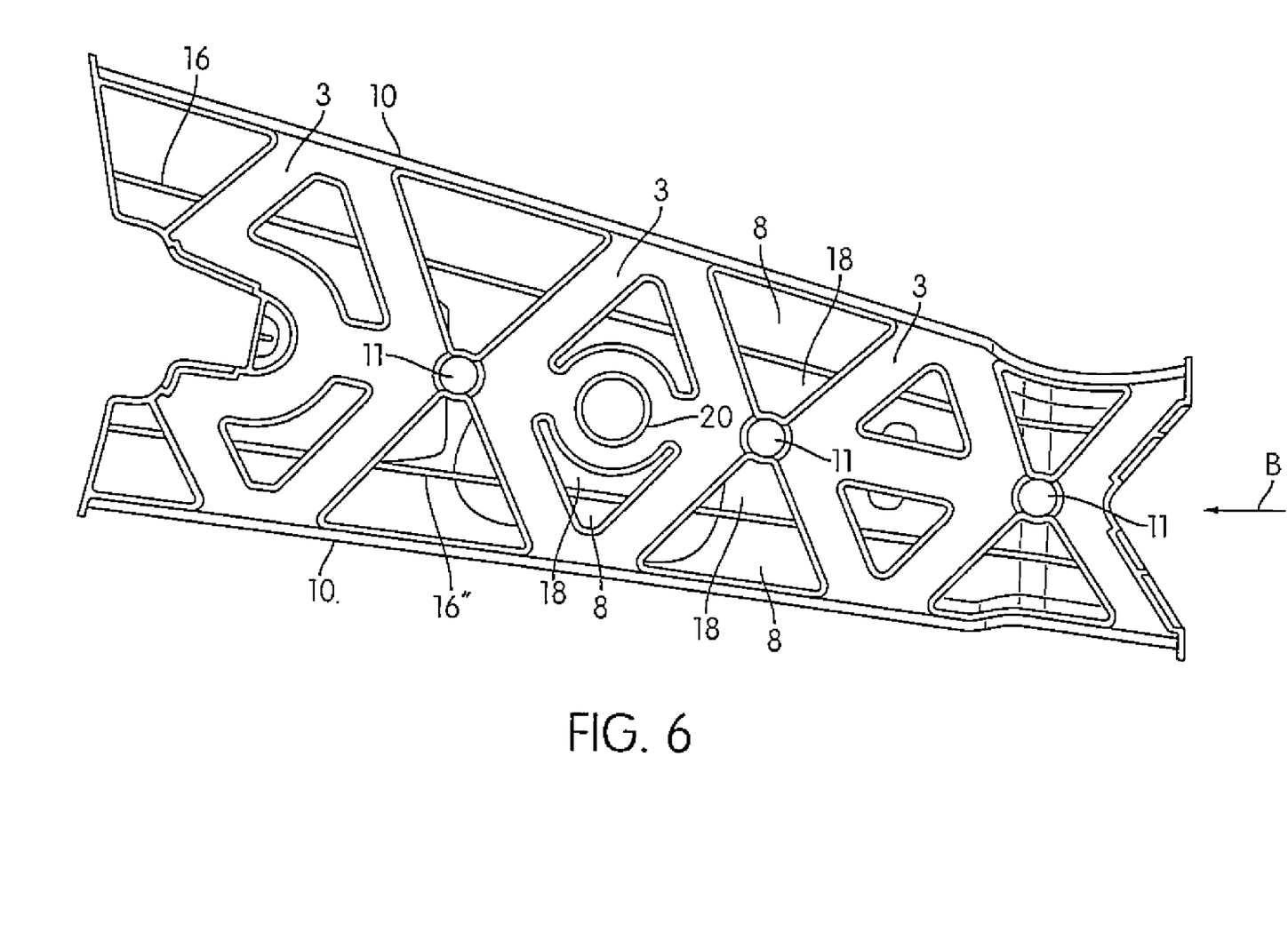
FIG. 6 shows a view on the "upper side" of the support.

FIG. 6 shows a view in the direction of the Z-axis on the upper side of the uncoated support. The upper sides of the external surface (3) are once again visible and are connected over the flow channels (11) with the lower side of the external surfaces of the support. Also visible are the separation walls (16, 16', 16") between the flow channels as well as the flow openings (8, 18) on the upper side, which back out of the flow channels. Once again, the dome (20) is illustrated in the central area of the support. Both of the lateral reinforcing ribs (10) in the longitudinal axis of the support are also visible in this view.

Figure 7:
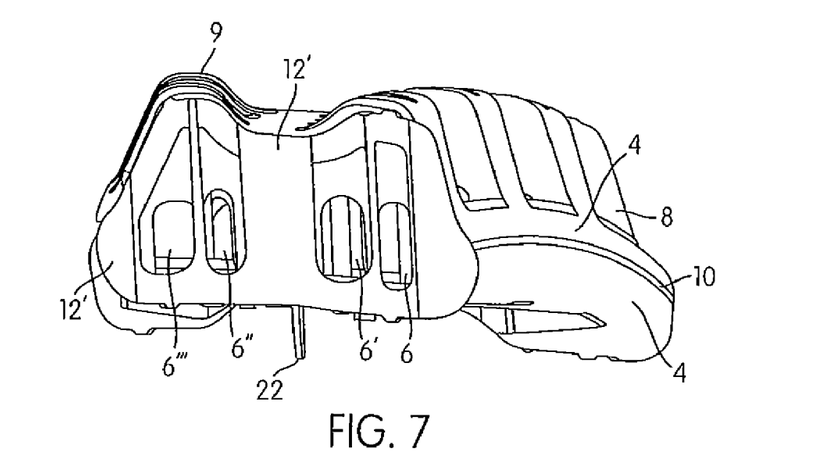
FIG. 7 shows a semi-perspective view on the narrower cross sectional side of the support from the view point "B" in FIG. 6.

FIG. 7 shows a semi-perspective view of the rear boundary wall (12') of the support as seen from the viewpoint "B" in FIG. 6. Once again the inflow and outflow openings of the flow channels (6, 6', 6", 6''') are visible in the rear boundary wall (12'). Moreover, the upper side and lower side parts of the lateral external surface (4) of the support are visible and are separated from one another by the lateral reinforcing rib (10). In this view the flow openings (8) on the upper side are also visible as well as the flanges (9). An element of the clip (22) is visible in the lower area.

Figure 8:
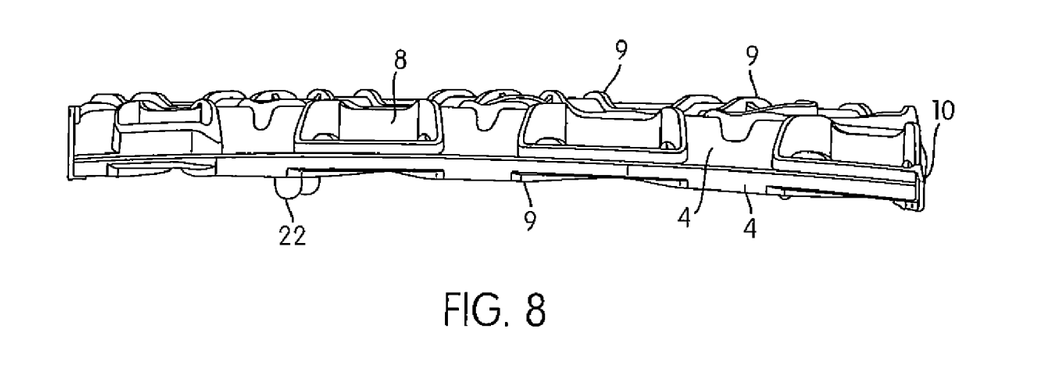
FIG. 8 shows a view on the long side of the support from the viewpoint "C" in FIGS. 3 and 6.

FIG. 8 shows a side view of the support along the X-axis from the viewpoint "C" in FIG. 3. The lateral reinforcing ribs (10) as well as the upper and lower sides (4) that are separated by these reinforcing ribs are once again visible. The flow openings (8) on the upper side as well as the flanges (9) and the fastening clips (22) on the lower side are also visible.

Figure 9:
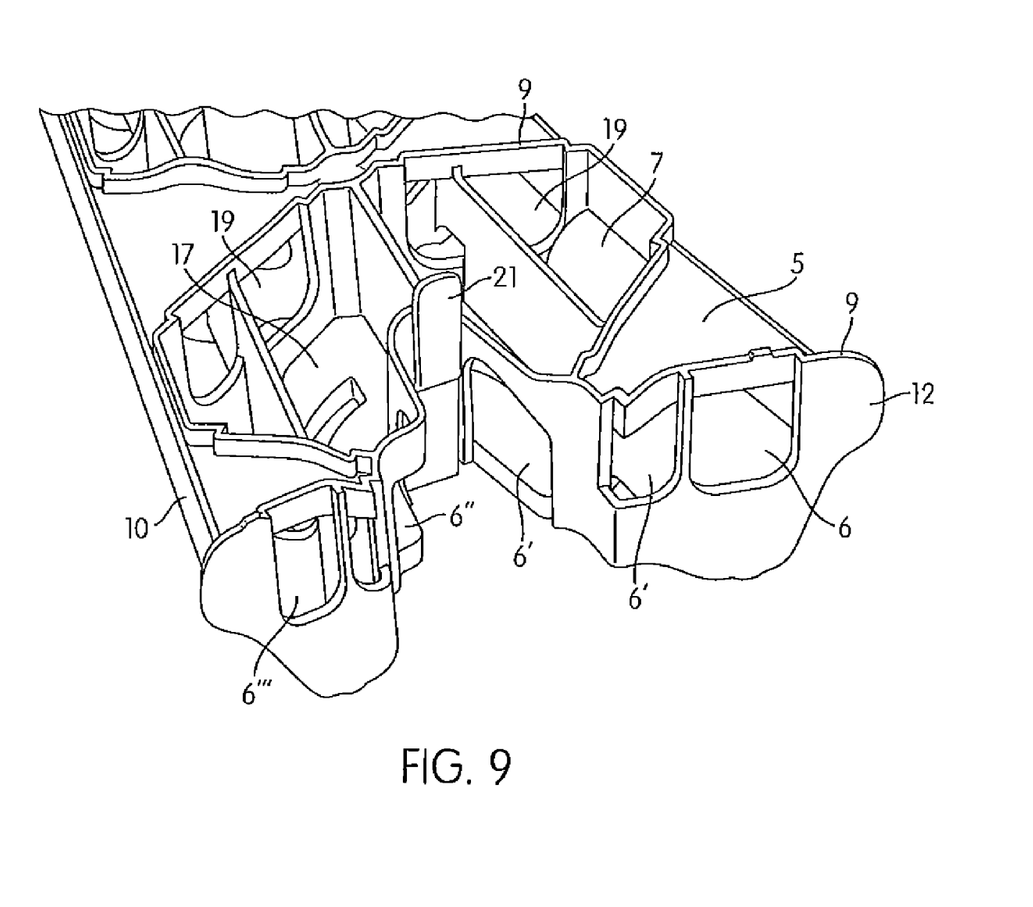
FIG. 9 shows a semi-perspective partial view of the "lower side" of the support in the wider area of the support view point "A".

FIG. 9 shows a semi-perspective detailed view of the front boundary wall (12) of the support as seen from the viewpoint "A" in FIG. 3. Once again the openings of the flow channels (6, 6', 6", 6''') in the front boundary wall (12) are clearly visible. Moreover, the flanges (9) as well as the lateral reinforcing ribs (10) are visible. The flow openings (7, 17) on the lower side as well as the inner openings (19) of the flow channels are also visible. In addition, one can recognize the upper external surfaces (5) of the support.

Figure 10:
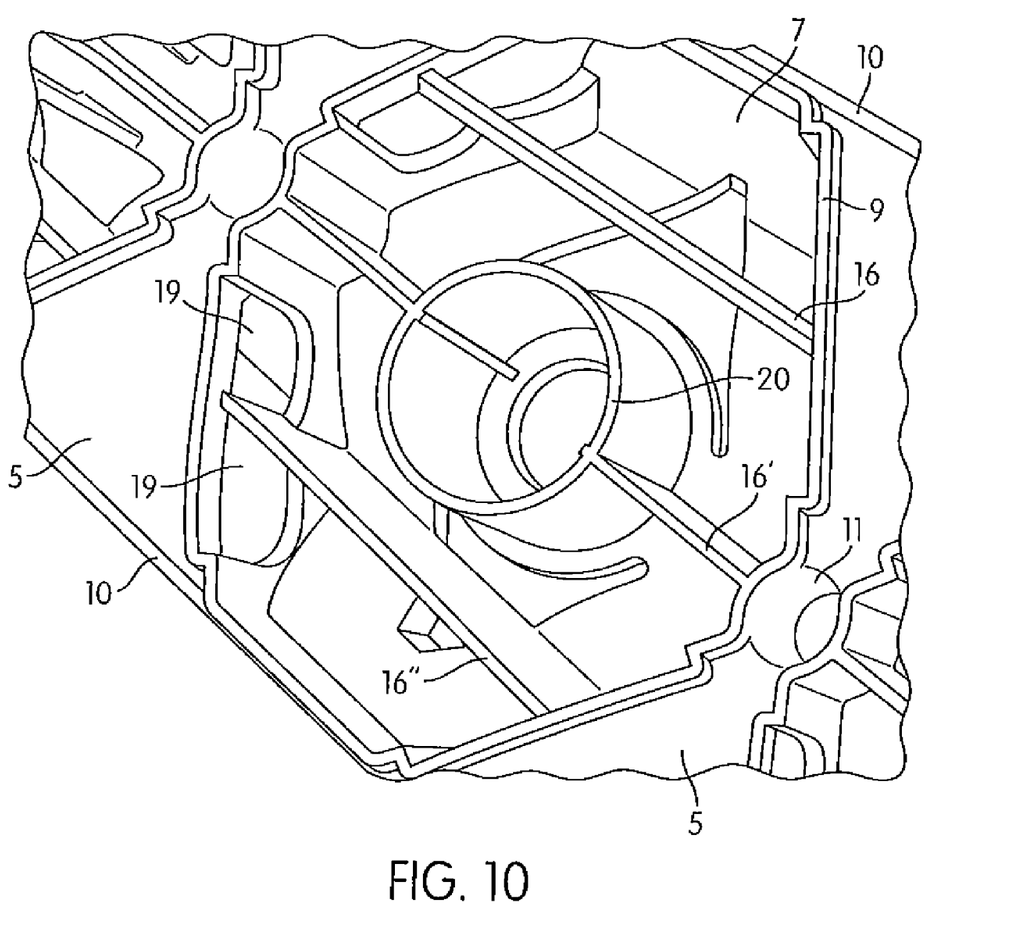
FIG. 10 shows a semi-perspective partial view of the "lower side" of the support in the central area of the support.

FIG. 10 shows a detailed view of the lower side of the support in the central area of the dome (20). The flow channels (11) are clearly visible as the connecting openings between the external surfaces (5) on the lower side and the external surfaces (3) on the upper side. In this detailed view a cut-out from the lateral reinforcing rib (10) is once again visible as well as the inner openings (19) of the flow channels that are separated by the separation walls (16, 16', 16").

In comparison with the known "compact" models, the use of the inventive reinforcing and stiffening components with flow channels offers a series of technical advantages:

- The total weight of the stiffening component can be reduced without lowering the reinforcing and stiffening effect;
- Improvement of the flow of the EDC deposition coating during the coating, resulting in a more uniform layer thickness of the EDC coating along the inner walls of the hollow support;
- Increased and more uniform flow of air through the hollow support during curing in the EDC oven, resulting in a uniform temperature distribution and optimum curing of the EDC coating and structural foam;
- "Center of gravity friendly" constructions of automobile bodies are made possible as it allows the use of lower sheet thicknesses in the upper region of the bodywork. Due to better driving characteristics, the lower total weight of the inventive reinforcing and stiffening components contributes to a desired shift of the center of gravity of the whole vehicle into the lower sector. Nevertheless, good results in regard to torsional and bending stiffness of the vehicle are still achieved.

What is claimed is:

1. A lengthwise extended component for placement in a cavity of a lengthwise extended hollow support that possesses one or more walls enclosing a cavity and has a longitudinal axis (x), said component comprising a support having a longitudinal x-axis that is positioned parallel to the longitudinal axis (x) of the lengthwise extended hollow support, has external surfaces provided with a layer of a thermally expansible and curable composition that after placement in said cavity faces the inner walls of said cavity, and possesses flow channels in the direction of the longitudinal x-axis of the support, wherein the flow channels possess flow openings that are arranged perpendicular to the longitudinal x-axis of the support and whose lateral boundaries are arranged diagonally to the longitudinal x-axis of the support.

2. A component according to claim 1, wherein said lengthwise extended hollow support is an automobile pillar.

3. A component according to claim 1, wherein the external surfaces provided with a layer of a thermally expansible and curable composition are perpendicular to a z-axis of the support and offset to one another in the direction of the x-axis of the support.

4. A component according to claim 1, wherein the lateral boundaries form lateral boundaries for the thermally expansible and curable composition.

5. A component according to claim 1, wherein the external surfaces provided with a layer of a thermally expansible and curable composition are perpendicular to a y-axis of the support and possess at least one reinforcing rib in the direction of the x-axis of the support.

6. A component according to claim 1, wherein the external surfaces provided with a layer of a thermally expansible and curable composition are connected to each other through flow channels.

7. A component according to claim 1, wherein prior to curing the thermally expansible and curable composition between the component and the inner walls of the cavity walls, a flow gap of up to 4 mm exists on all sides of the component.

8. A component according to claim 1, wherein the support is comprised of polyamide.

9. A component according to claim 1, wherein the support is reinforced with fibers.

10. A component according to claim 9, wherein the fibers are selected from the group consisting of glass fibers, polyamide fibers, polyimide fibers, carbon fibers, steel fibers and aluminum fibers.

11. A component according to claim 1, wherein the support is comprised of one or more mineral fillers selected from the group consisting of ground and precipitated chalks, carbon black, calcium magnesium carbonate, barium sulfate and mixtures thereof.

12. A component according to claim 1, wherein the support is comprised of a polyamide-6.

13. A component according to claim 1, wherein the thermally expansible and curable composition is comprised of one or more epoxy resins, one or more curing agents and one or more blowing agents.

14. A component according to claim 1, wherein the thermally expansible and curable composition in the unexpanded state has a layer thickness of 2 to 15 mm.

15. A component according to claim 1, wherein the thermally expansible and curable composition has a degree of expansion of 50 to 100%.

16. A component according to claim 1, wherein the thermally expansible and curable composition expands and cures at temperatures between 130 and 220° C.

17. A stiffened and/or reinforced automobile pillar comprising a lengthwise extended component according to claim 1, wherein said expansible and curable composition has been expanded and cured at temperatures between 130 and 220° C.

18. A method of stiffening and/or reinforcing a cavity of a lengthwise extended hollow support that possesses one or more walls enclosing a cavity and has a longitudinal axis (x), said method comprising placing a component according to claim 1 in said cavity and heating said component at a temperature effective to cause expansion and curing of said expansible and curable composition.

19. A lengthwise extended component for placement in a cavity of a lengthwise extended hollow support that possesses one or more walls enclosing a cavity and has a longitudinal axis (x), said component comprising a support having a longitudinal x-axis that is positioned parallel to the longitudinal axis (x) of the lengthwise extended hollow support, has external surfaces provided with a layer of a thermally expansible and curable composition that after placement in said cavity faces the inner walls of said cavity, and possesses flow channels in the direction of the longitudinal x-axis of the support;
    wherein the external surfaces provided with a layer of a thermally expansible and curable composition are perpendicular to a z-axis of the support and offset to one another in the direction of the x-axis of the support.

20. A component according to claim 19, wherein said lengthwise extended hollow support is an automobile pillar.

21. A component according to claim 19, wherein the flow channels possess flow openings that are arranged perpendicular to the longitudinal x-axis of the support and whose lateral boundaries are arranged diagonally to the longitudinal x-axis of the support.

22. A component according to claim 21, wherein the lateral boundaries form lateral boundaries for the thermally expansible and curable composition.

23. A component according to claim 19, wherein the external surfaces provided with a layer of a thermally expansible and curable composition are perpendicular to a y-axis of the support and possess at least one reinforcing rib in the direction of the x-axis of the support.

24. A component according to claim 19, wherein the external surfaces provided with a layer of a thermally expansible and curable composition are connected to each other through flow channels.

25. A component according to claim 19, wherein prior to curing the thermally expansible and curable composition between the component and the inner walls of the cavity walls, a flow gap of up to 4 mm exists on all sides of the component.

26. A component according to claim 19, wherein the support is comprised of polyamide.

27. A component according to claim 19, wherein the support is reinforced with fibers.

28. A component according to claim 27, wherein the fibers are selected from the group consisting of glass fibers, polyamide fibers, polyimide fibers, carbon fibers, steel fibers and aluminum fibers.

29. A component according to claim 19, wherein the support is comprised of one or more mineral fillers selected from the group consisting of ground and precipitated chalks, carbon black, calcium magnesium carbonate, barium sulfate and mixtures thereof.

30. A component according to claim 19, wherein the support is comprised of a polyamide-6.

31. A component according to claim 19, wherein the thermally expansible and curable composition is comprised of one or more epoxy resins, one or more curing agents and one or more blowing agents.

32. A component according to claim 19, wherein the thermally expansible and curable composition in the unexpanded state has a layer thickness of 2 to 15 mm.

33. A component according to claim 19, wherein the thermally expansible and curable composition has a degree of expansion of 50 to 100%.

34. A component according to claim 19, wherein the thermally expansible and curable composition expands and cures at temperatures between 130 and 220° C.

35. A stiffened and/or reinforced automobile pillar comprising a lengthwise extended component according to claim 19, wherein said expansible and curable composition has been expanded and cured at temperatures between 130 and 220° C.

36. A method of stiffening and/or reinforcing a cavity of a lengthwise extended hollow support that possesses one or more walls enclosing a cavity and has a longitudinal axis (x), said method comprising placing a component according to claim 19 in said cavity and heating said component at a temperature effective to cause expansion and curing of said expansible and curable composition.

37. A lengthwise extended component for placement in a cavity of a lengthwise extended hollow support that possesses one or more walls enclosing a cavity and has a longitudinal axis (x), said component comprising a support having a longitudinal x-axis that is positioned parallel to the longitudinal axis (x) of the lengthwise extended hollow support, has external surfaces provided with a layer of a thermally expansible and curable composition that after placement in said cavity faces the inner walls of said cavity, and possesses flow channels in the direction of the longitudinal x-axis of the support;
    wherein the external surfaces provided with a layer of a thermally expansible and curable composition are connected to each other through flow channels.

38. A component according to claim 37, wherein said lengthwise extended hollow support is an automobile pillar.

39. A component according to claim 37, wherein the flow channels possess flow openings that are arranged perpendicular to the longitudinal x-axis of the support and whose lateral boundaries are arranged diagonally to the longitudinal x-axis of the support.

40. A component according to claim 37, wherein the external surfaces provided with a layer of a thermally expansible and curable composition are perpendicular to a z-axis of the support and offset to one another in the direction of the x-axis of the support.

41. A component according to claim 37, wherein the lateral boundaries form lateral boundaries for the thermally expansible and curable composition.

42. A component according to claim 37, wherein the external surfaces provided with a layer of a thermally expansible and curable composition are perpendicular to a y-axis of the support and possess at least one reinforcing rib in the direction of the x-axis of the support.

43. A component according to claim 37, wherein prior to curing the thermally expansible and curable composition between the component and the inner walls of the cavity walls, a flow gap of up to 4 mm exists on all sides of the component.

44. A component according to claim 37, wherein the support is comprised of polyamide.

45. A component according to claim 37, wherein the support is reinforced with fibers.

46. A component according to claim 45, wherein the fibers are selected from the group consisting of glass fibers, polyamide fibers, polyimide fibers, carbon fibers, steel fibers and aluminum fibers.

47. A component according to claim 37, wherein the support is comprised of one or more mineral fillers selected from the group consisting of ground and precipitated chalks, carbon black, calcium magnesium carbonate, barium sulfate and mixtures thereof.

48. A component according to claim 37, wherein the support is comprised of a polyamide-6.

49. A component according to claim 37, wherein the thermally expansible and curable composition is comprised of one or more epoxy resins, one or more curing agents and one or more blowing agents.

50. A component according to claim 37, wherein the thermally expansible and curable composition in the unexpanded state has a layer thickness of 2 to 15 mm.

51. A component according to claim 37, wherein the thermally expansible and curable composition has a degree of expansion of 50 to 100%.

52. A component according to claim 37, wherein the thermally expansible and curable composition expands and cures at temperatures between 130 and 220° C.

53. A stiffened and/or reinforced automobile pillar comprising a lengthwise extended component according to claim 37, wherein said expansible and curable composition has been expanded and cured at temperatures between 130 and 220° C.

54. A method of stiffening and/or reinforcing a cavity of a lengthwise extended hollow support that possesses one or more walls enclosing a cavity and has a longitudinal axis (x), said method comprising placing a component according to claim 37 in said cavity and heating said component at a temperature effective to cause expansion and curing of said expansible and curable composition.

* * * * *